United States Patent [19]
Iemura et al.
[11] Patent Number: 4,559,545
[45] Date of Patent: Dec. 17, 1985

[54] RECORDING APPARATUS

[75] Inventors: Shigeru Iemura, Kawasaki; Akira Kawano, Yokohama, both of Japan
[73] Assignee: Matsushita Graphic Communication Systems, Inc., Tokyo, Japan

[21] Appl. No.: 558,523
[22] Filed: Dec. 6, 1983
[30] Foreign Application Priority Data
Dec. 7, 1982 [JP] Japan ........ 57-215306
Dec. 7, 1982 [JP] Japan ........ 57-215307
[51] Int. Cl.[4] ........ G01D 15/06
[52] U.S. Cl. ........ 346/155
[58] Field of Search ........ 346/155, 139 C

[56] References Cited
U.S. PATENT DOCUMENTS
3,914,771 10/1975 Lunde et al. ........ 346/155 X
4,440,709 8/1983 de Kermadec et al. ........ 346/155 X
FOREIGN PATENT DOCUMENTS
38899 8/1982 Japan .

*Primary Examiner*—Thomas H. Tarcza
*Attorney, Agent, or Firm*—Spencer & Frank

[57] ABSTRACT

A recording apparatus wherein a recording medium is fed through the gap between recording electrodes and a rear electrode which are arranged to face each other. A magnetic toner is supplied to the gap between the recording medium and the recording electrodes. While under the state where a magnetic field is formed around the recording electrodes to retain toner particles on the recording electrodes, voltage pulses are selectively applied between the recording electrodes and the rear electrode to thereby transfer the toner particles on the recording electrodes to thereby the recording medium by means of coulomb forces for effecting a recording. The recording electrodes are constituted by recording electrode patterns mounted on a rigid board of an insulating non-magnetic material attached to the periphery of a cylindrical hollow member which houses a rotatable magnet roll.

8 Claims, 10 Drawing Figures

RECORDING APPARATUS

BACKGROUND OF THE INVENTION

1. Field of the Invention

The present invention relates to an improvement in a recording apparatus for use in a picture recording system, such as a facsimile, copying machine and the like.

2. Description of the Prior Art

First, the prior art in this field will be described hereinunder with specific reference to FIG. 1 which is a sectional view of a typical conventional recording apparatus. In the Figure, a cylindrical hollow member (sleeve) 1 is formed from a non-magnetic material, such as aluminum and a stainless-steel material. A magnet roll 2 is constituted by a plurality of magnets assembled in a roll-like shape. A hopper and toner are denoted by reference numerals 3 and 4, respectively. Although FIG. 1 shows one recording electrode 5, actually, a multiplicity of recording electrodes 5 are provided in a row along the direction parallel to the axis of the hollow member 1. A rear electrode and a recording medium are represented by reference numerals 6 and 7, respectively. In addition, an electronic circuit 8 is adapted to selectively apply voltage pulses between the recording electrodes 5 and the rear electrode 6.

In this apparatus, the rotation of the magnet roll 2 in the direction of an arrow A causes the toner 4 to be drawn out onto the outer peripheral surface of the hollow member 1. The toner 4 is then transported in the direction of an arrow C along the outer peripheral surface of the hollow member 1 to reach the recording electrodes 5. Under this state, voltage pulses are selectively applied between the recording electrodes 5 and the rear electrode 6 by the electronic circuit 8. Consequently, the toner particles on the recording electrodes 5 to which the voltage pulses are applied are transferred to the recording medium 7 by coulomb forces against the magnetic force exerted by the magnet roll 2, to adhere to the recording medium 7 as dots, thereby effecting a recording.

The specification of Japanese Patent Publication No. 38899/1982 discloses a recording apparatus of this type more practically. The recording apparatus shown in that specification is constructed as follows: The recording electrodes 5 are constituted by the pointed end portions of conductor patterns (leads), respectively, formed on a flexible printed circuit board, which is bonded to the hollow member 1 along the outer peripheral surface thereof so as not to interfere with the transportion of the toner. In addition, the end portions of the circuit board on the side opposite to the recording electrodes 5 are taken out to both sides of the hollow member 1 and connected to the electronic circuit 8 through connectors, respectively.

The recording apparatus constructed as above, however, has the following problems to be solved:

(a) In a recording apparatus used in a facsimile or other like system, the density (picture element density) of the recording electrodes 5 is generally required to be eight or more pieces per millimeter. However, the density of the conductor patterns that can be formed on a flexible printed circuit board is generally about three to five pieces per millimeter and it is difficult to obtain a density more than that on the grounds of production yield, because of a low mechanical strength of the board; a high moisture absorption of the board; and a poor adhesion between the board and the pattern.

(b) As the conductor patterns formed on a single flexible printed circuit board are increased in number, the production yield becomes lower. Therefore, a single flexible printed circuit board will not make it possible to obtain recording electrodes in number required for a facsimile or other like system, and it is necessary to join a multiplicity of flexible printed circuit boards together. It is, however, extremely difficult as well as costly to join a multiplicity of flexible printed circuit boards together so that the pointed end portions of their conductor patterns are arranged in a straight line, and to prevent the pitch between the adjacent conductor patterns from being nonuniform at the joints between the adjacent flexible printed circuit boards.

(c) Since the whole of the electronic circuit 8 is disposed away from the hollow member 1 and the flexible printed circuit boards are extended to the electronic circuit 8 to connect thereto, the apparatus is inevitably increased in size, and it is troublesome to handle the extended portions of the flexible printed circuit boards.

SUMMARY OF THE INVENTION

Accordingly, a primary object of the invention is to provide a recording apparatus improved to permit the recording electrodes to be easily made higher in density and the apparatus to be reduced in size as well as an improvement in reliability and a reduction in production cost and moreover to allow a remarkable reduction in number of input lines led to the recording head thereby to facilitate the handling of the input lines.

To this end, according to the invention, there is provided a recording apparatus wherein a recording medium is fed through the gap between recording electrodes and a rear electrode which are arranged to face each other, and a magnetic toner is supplied to the gap between the recording medium and the recording electrodes, while under the state where a magnetic field is formed around recording electrodes to retain toner particles on the recording electrodes, voltage pulses are selectively applied between the recording electrodes and the rear electrode, thereby to transfer the toner particles on the recording electrodes to the recording medium for effecting a recording, characterized in that a recording head comprises: a rigid board; recording electrode patterns formed on the rigid board; a voltage pulse applying circuit mounted on the rigid board or other board and adapted to selectively apply voltage pulses to the recording electrodes; and so forth, and that the recording head is housed within a magnetic field produced by a magnet.

The above and other objects, features and advantages of the invention will become clear from the following description of the preferred embodiments thereof taken in conjunction with the accompanying drawings.

DESCRIPTION OF THE PREFERRED EMBODIMENTS

The invention will be described hereinunder in detail through embodiments shown in the accompanying drawings.

Figure 1:
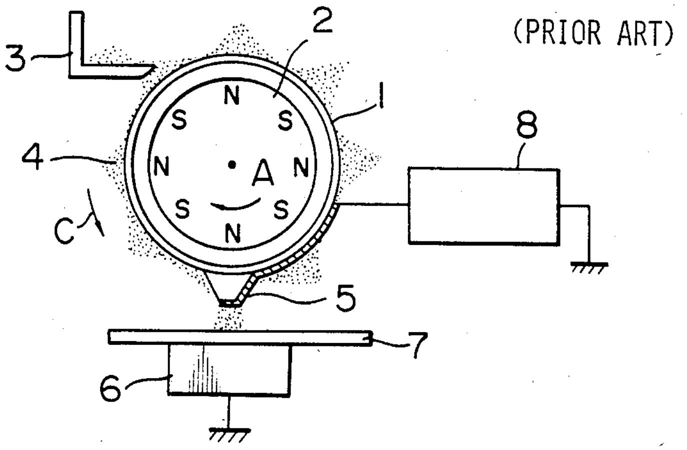
FIG. 1 is a side elevational view of an essential part of a conventional recording apparatus employing a toner.
Figure 2:
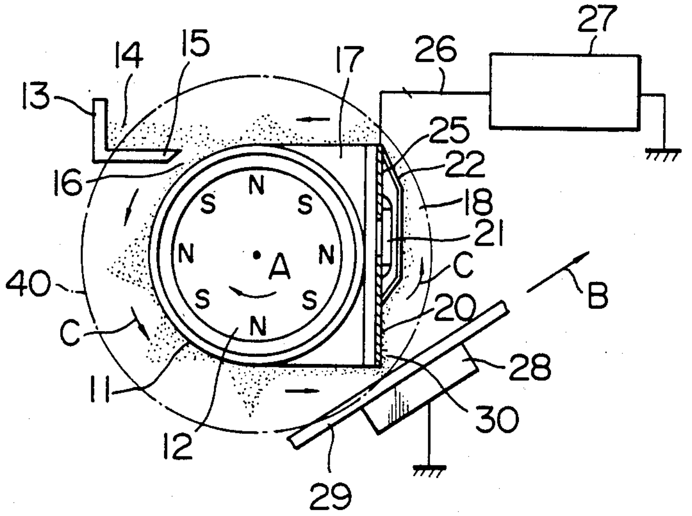
FIG. 2 is a side elevational view of an essential part of a recording apparatus in accordance with an embodiment of the invention.
Figure 3:
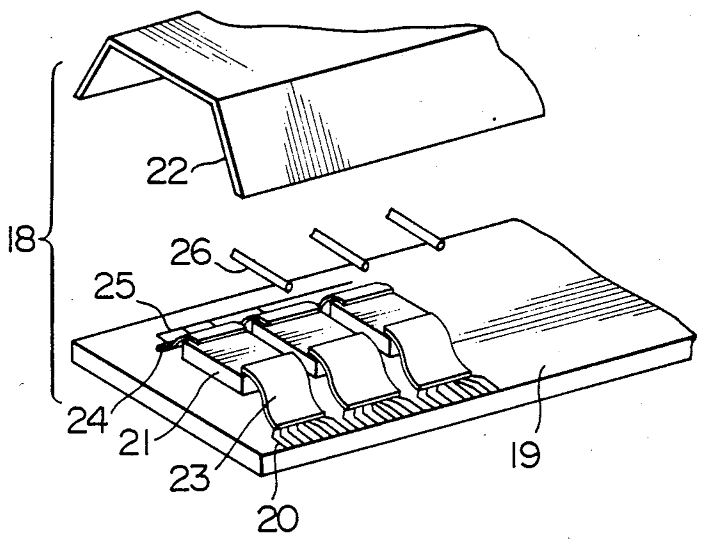
FIG. 3 is an exploded perspective view of the same essential part of the recording apparatus shown in FIG. 2.

FIG. 2 is a sectional view of a recording apparatus in accordance with an embodient of the invention, and FIG. 3 is an exploded perspective view of a recording head in the recording apparatus. In these Figures, a cylindrical hollow member 11 is made of an electrically-conductive non-magnetic material, such as an aluminum-base alloy, or an insulating non-magnetic material, such as a synthetic resin. A magnet roll 12 constituted by a plurality of magnets assembled in a roll-like shape is housed in the hollow member 11 rotatably as well as coaxially therewith. The magnet roll 12 has S-poles and N-poles alternately formed on the outer peripheral surface thereof. In addition, the magnet roll 12 is adapted to be rotated in the direction of an arrow A by means of a magnet driving device, not shown.

A hopper 13 is provided in the vicinity of the upper part of the hollow member 11. The hopper 13 contains a magnetic toner 14. Further, the hopper 13 has a doctor 15 formed at an opening in the bottom part thereof. The tip portion of the doctor 15 is arranged to face the outer peripheral surface of the hollow member 11 through a doctor gap 16.

A recording head 18 is mounted on the hollow member 11 through a toner guide 17 made of a non-magnetic material. The recording head 18 is constituted by, as shown in FIG. 3 in detail, a rigid board 19, recording electrode patterns 20, driver chips 21, a protection cover 22 and so forth. The construction of the recording head 18 will be described hereinunder in more detail.

The rigid board 19 is made of a rigid non-magnetic material, such as ceramics and is mounted on the hollow member 11 through the toner guide 17. It is to be noted that the rigid board 19 is mounted on the hollow member 11 so that the plane of the rigid board 19 is tangential to the outer peripheral surface of the hollow member 11. In addition, the upper and lower sides of the toner guide 17 extend tangentially to the outer peripheral surface of the hollow member 11 to connect the outer peripheral surface of the hollow member 11 and the upper and lower ends of the rigid board 19, respectively.

The recording electrode patterns 20 are constituted by a conductor foil formed on the rigid board 19 by a fine-pattern processing technique such as photoetching. In this embodiment, a total of 2048 recording electrode patterns 20 are arranged at the same pitch, eight pieces per millimeter. The lower end portions of these recording electrode patterns 20 extend to the lower end portion of the rigid board 19. It is to be noted that the recording electrode patterns 20 may be constituted by either a magnetic or non-magnetic material.

Each driver chip 21 is constituted by an integrated circuit incorporating therein shift registers into which picture signals are fed, latches, drivers for driving the recording electrode patterns 20, and so forth, and can be formed to have a size of about 4 by 4 mm or less and a thickness of about 2 mm or less. The driver chips 21 are mounted on the rigid board 19 in number corresponding to that of the recording electrode patterns 20. More specifically, in this embodiment, one driver chip 21 is provided with the drivers and so forth for 32 recording electrode patterns 20. Therefore, a total of 64 driver chips 21 are mounted on the rigid board 19, and these driver chips 21 in combination constitute the voltage pulse applying circuit in this embodiment.

The output terminal of each driver chip 21 is connected to the corresponding recording electrode patterns 20 through a film carrier 23. On the other hand, the input terminal of each driver chip 21 is connected to an external circuit 27 provided outside the recording head 18 through a corresponding film carrier 24, input-side connecting pattern 25 formed on the rigid board 19, and input line 26. From this external circuit 27 are fed a driving voltage for actuating the chip 21, and a recording voltage, clock, picture signal, latching signal, enabling signal and so forth for actuating the drivers.

It is to be noted that it is not always necessary to employ the film carriers for connecting the driver chip 21, the recording electrode patterns 20 and the input-side connecting pattern 25, and the connection may be effected by other means such as bonding.

Being mounted on the rigid board 19, the protection cover 22 covers the driver chips 21 and the film carriers 23, 24. However, the lower end portions of the recording electrode patterns 20 are exposed to the outside of the protection cover 22.

The recording head 18 thus constituted, together with the hollow member 11 and the toner guide 17, is housed within a magnetic field 40 produced by the magnet roll 12.

Moreover, the lower end portions of the recording electrode patterns 20 of the recording head 18 are arranged to face a rear electrode 28 through a gap. A recording medium 29, such as an electrostatic recording paper and ordinary paper, is fed through the gap between the lower end portions of the recording electrode patterns 20 and the rear electrode 28 in the direction of an arrow B by a recording medium feeding means, such as a paper feed roller, not shown.

The following is the description of the operation of this recording apparatus.

As the magnet roll 12 is rotated by the magnet driving device, the magnetic field produced by the magnet roll 12 also revolves. This revolving magnetic field causes the toner 14 in the hopper 13 to be drawn out onto the outer peripheral surface of the hollow member 11 through the doctor gap 16. The toner 14 is transported along the outer peripheral surface in the direction (the direction of an arrow C) opposite to the rotational direction of the magnet roll 12 and along the undersurface of the toner guide 17 to reach the lower end portions of the recording electrode patterns 20.

The toner 14 thus having reached the lower end portions of the recording electrode patterns 20 forms a toner chain (a chain formed by toner particles arranged along the magnetic line of force exerted by the magnet roll 12) 30 along the lower end portions of the recording electrode patterns 20.

Under the state where such a toner chain 30 is formed, the driver chips 21 selectively apply voltage pulses between the recording electrode patterns 20 and the rear electrode 28 according to the picture and other signals fed thereinto from the external circuit 27. Consequently, in a manner similar to that in the case of the conventional recording apparatus, the toner particles at the end portions of the toner chain 30 on the selected recording electrode patterns 20 are transferred to the recording medium 29 by coulomb forces against the magnetic force exerted by the magnet roll 12. As a result, dots corresponding to the selected recording electrode patterns 20 are printed on the recording medium 29.

Accordingly, if the recording medium 29 is fed by the recording medium feeding means in parallel with the application of the voltage pulses, then a picture corresponding to the picture signal is recorded on the recording medium 29.

On the other hand, the toner particles having reached the lower end portions of the recording electrode patterns 20 but not having been transferred to the recording medium 29 return to the hopper 13 section by being transported along the upper surfaces of both the protection cover 22 of the recording head 18 and the toner guide 17, since the recording head 18, together with the hollow member 11 and the toner guide 17, is housed within the magnetic field produced by the magnet roll 12. More specifically, in this recording apparatus, since the recording head 18 is housed within the magnetic field, there is no possibility that the recording head 18 may interfere with the transportation of the toner 14.

In general, it is easier to carry out a fine-pattern processing on a rigid board than a flexible board, since the former is higher in mechanical strength, lower in moisture absorption and better in adhesion thereof to patterns than the latter. Accordingly, if the recording electrode patterns 20 are formed on the rigid board 19 as in the case of this recording apparatus, then it is possible to make the recording electrode patterns 20 much higher in density than those in the above-mentioned conventional apparatus in which the recording electrode patterns are formed on a flexible board. Thus, a density of eight or more pieces per millimeter can be easily obtained. In addition, with this advantage, it is possible to form a necessary number of recording electrode patterns 20 on a single rigid board 19. Therefore, there will be no problem of the linearity of the arrangement of the electrode patterns 20 or the accuracy in the arrangement pitch, so that a recording head of high quality and reliability can be obtained at low cost.

Moreover, in this recording apparatus, the driver chips 21 are mounted on the recording head 18. Therefore, the apparatus can be reduced in size. In addition, the wiring for connection between the driver chips 21 and the recording electrode patterns 20 is not required to be led out from the recording head 18. Further, although the recording head 18 has the picture and other signals fed thereinto from the external circuit 27 through the input lines 26 as described above, the number of the input lines 26 can be reduced to several to several tens. Accordingly, the number of the input lines 26 is much smaller than the number (2048) of the recording electrode patterns 20, and the handling of the input lines 26 is facilitated. In addition, there is no possibility that the input lines 26 may interfere with the transportation of the toner 14.

In the above-described embodiment, since the driver chips 21 and the like are covered with the protection cover 22, the toner 14 is smoothly carried and the driver chips 21 are advantageously protected from contacting the toner 14. It is, however, to be noted that a similar advantage can be obtained also by molding the whole of the recording head 18 (except for the necessary portions of the recording electrode patterns 20) with an insulating material in place of providing the protection cover 22.

In addition, although the hollow member 11 and the toner guide 17 are separately provided in the above embodiment, they may be integrally molded.

Figure 4:
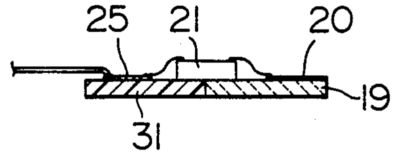
FIG. 4 is a sectional side elevational view of a recording head in accordance with another embodiment of the invention.

Moreover, although in the embodiment all the patterns, i.e., both the recording electrode patterns 20 and the input-side connecting patterns 25 are formed on a single rigid board 19, this formation is not always necessary. For example, two boards may be employed as shown in FIG. 4 which is a sectional view of a recording head in accordance with another embodiment of the invention. More specifically, in this embodiment, a rigid board 19 made of ceramics and having the recording electrode patterns 20 formed thereon and a rigid board 31 made of glass reinforced epoxy resin and having the input-side connecting patterns 25 formed thereon are attached to the outer peripheral side of a hollow member, not shown, so as to be adjacent to each other, and the driver chips 21 are mounted stretching over both the boards 19 and 31.

The ceramic rigid board suitable for forming the recording electrode patterns is generally high in cost, while the glass reinforced epoxy resin board is relatively low in cost. Therefore, by properly combining both of them, a recording head having a desired function can be advantageously manufactured at low cost.

Figure 5:
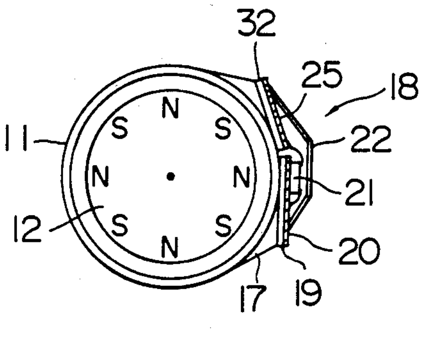
FIG. 5 is a side elevational view of an essential part of a recording apparatus in accordance with still another embodiment of the invention.

FIG. 5 is a sectional view of a recording apparatus in accordance with still another embodiment of the invention. In this embodiment, the rigid board 19 having the recording electrode patterns 20 formed thereon and a rigid board 32 having the input-side connecting patterns 25 formed thereon are attached to the hollow member 11 at such an angle that both the boards in combination form a dogleg shape (it is to be noted that reference numerals 12, 21 and 22 denote a magnet roll, driver chips and a protection cover, respectively).

The construction of the recording apparatus in accordance with this embodiment makes it possible to prevent the end portion of the recording head from being far away from the magnet roll 12, so that it is possible to ensure the movement of the toner with the rotation of the magnet roll 12.

As will be clear from the above-described embodiment, the recording head 18 may have any shape, provided that the recording head 18 is housed within the magnetic field produced by the magnet roll 12 so that the transportation of the toner 14 can be effected without hindrance.

Figure 6:
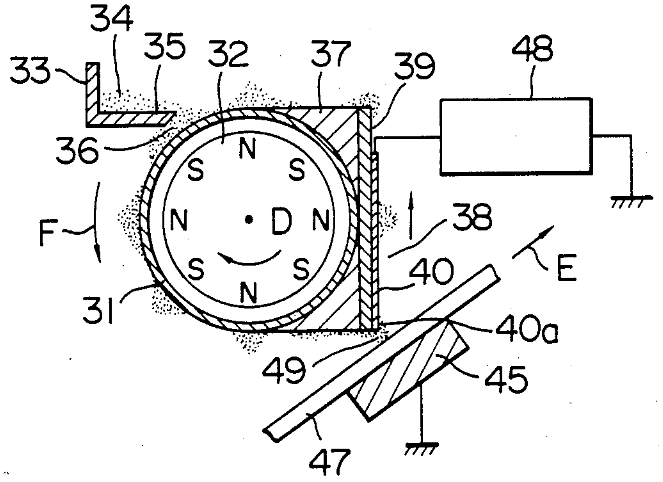
FIG. 6 is a side elevational view of an essential part of a recording apparatus in accordance with a further embodiment of the invention.
Figure 7:
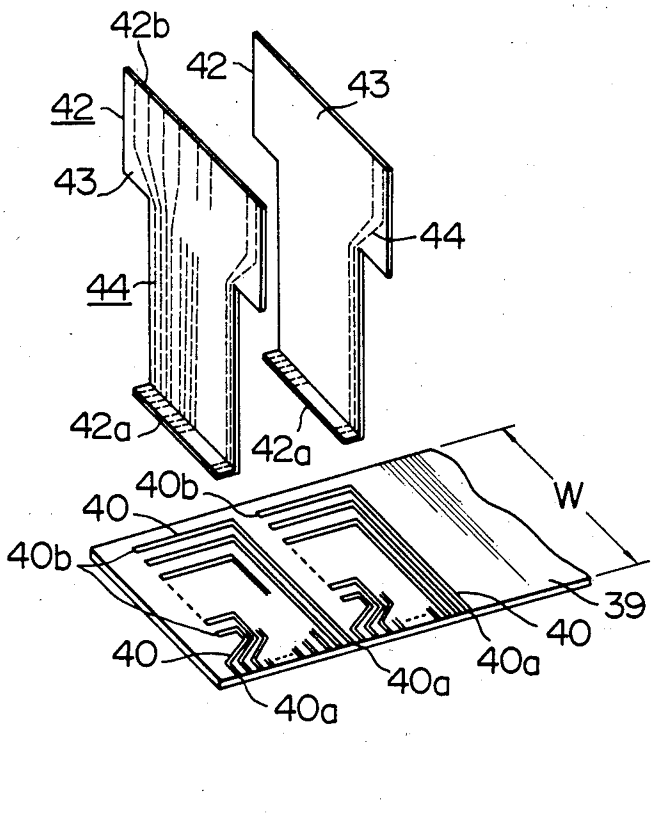
FIG. 7 is an exploded perspective view of the same essential part of the recording apparatus shown in FIG. 6.

FIGS. 6 and 7 are a sectional view and an exploded perspective view, respectively, which in combination show a further embodiment of the invention. In these Figures, a cylindrical hollow member 31 is made of an electrically-conductive non-magnetic material, such as an aluminum-base alloy, or an insulating non-magnetic material, such as a synthetic resin. A magnet roll 32 constituted by a plurality of magnets assembled in a roll-like shape is housed in the hollow member 31 rotatably as well as coaxially therewith. The magnet roll 32 has S-poles and N-poles alternately formed on the outer peripheral surface thereof. In addition, the magnet roll 32 is adapted to be rotated in the direction of an arrow D by means of a magnet driving device, not shown.

A hopper 33 is provided in the vicinity of the upper part of the hollow member 31. The hopper 33 contains a magnetic toner 34. Further, the hopper 33 has a doctor 35 formed at an opening in the bottom part thereof. The tip portion of the doctor 35 is arranged to face the outer peripheral surface of the hollow member 31 through a doctor gap 36.

A recording head 38 is mounted on the hollow member 31 through a toner guide 37 made of a non-magnetic material. The recording head 38 is composed of, as shown in FIG. 7 in detail: a rigid board 39 made of a rigid material, such as ceramics; recording electrode patterns 40 constituted by a conductor foil formed on the rigid board 39 by a fine-pattern processing technique, such as photo-etching; and a plurality of flexible circuit boards 42 for connecting these recording electrode patterns 40 to a voltage pulse applying circuit 48, described later. It is to be noted that the recording electrode patterns 40 may be constituted by either a magnetic or non-magnetic material.

The rigid board 39 is disposed so that the plane thereof is tangential to the outer peripheral surface of the hollow member 31. In addition, the rigid board 39, together with the hollow member 31, is housed within the magnetic field produced by the magnet roll 32. Moreover, the upper and lower sides of the toner guide 37 extend tangentially to the outer peripheral surface of the hollow member 31 to connect the outer peripheral surface of the hollow member 31 and the upper and lower ends of the rigid board 39, respectively.

One end portions 40*a* of the recording electrode patterns 40 are extended to the lower end portion of the rigid board 39 and arranged at the same pitch at the lower end of the rigid board 39. On the other hand, the other end portions 40*b* of the recording electrode patterns 40 are bent so as to be parallel to the axis of the hollow member 31 every predetermined number of the recording electrode patterns 40. In addition, the pitch between the adjacent end portions 40*b* is made larger than that between the adjacent end portions 40*a* (e.g., the pitch between the adjacent end portions 40*a* is eight pieces per millimeter; and the pitch between the end portions 40*b* is three to five pieces per millimeter).

Each flexible circuit board 42, which is a flexible printed circuit board, is constituted by an insulating flexible board 43 and conductor patterns 44 formed thereon. The pitch between the adjacent conductor patterns 44 at one end portion 42*a* is made equal to that between the lower end portions 40*b* of the adjacent recording electrode patterns 40. On the other hand, the pitch between the adjacent conductor patterns 44 at the other end portions 42*b* is made larger than that between the lower end portions 40*b* of the adjacent recording electrode patterns 40.

Moreover, the end portion 42*a* of each flexible printed circuit board 42 is connected to the rigid board 39 by means of thermocompression bonding so that the end portions 40*b* of the recording electrode patterns 40 and the conductor patterns 44 are connected to each other, respectively. It is to be noted that, in this case, each flexible printed circuit board 42 is formed so as to rise from the rigid board 39 in the direction perpendicular to the axis of rotation of the magnet roll 32.

The lower end portions 40*a* of the recording electrode patterns 40 are arranged to face a rear electrode 45 through a gap. A recording medium 47, such as an electrostatic recording paper and an ordinary paper, is fed through the gap between the lower end portions 40*b* of the recording electrode patterns 40 and the rear electrode 45 in the direction of an arrow E by means of a recording medium feeding means, such as a paper feed roller, not shown. The voltage pulse applying circuit 48 is connected to the electrode patterns 40 through the conductor patterns 44 formed on the flexible printed circuit boards 42, respectively.

The following is the description of the operation of the recording apparatus thus constructed.

When the magnet roll 32 is rotated by the magnet driving device, the magnetic field produced by the magnet roll 32 also revolves. In consequence, the toner 34 in the hopper 33 is drawn out onto the outer peripheral surface of the hollow member 31 through the doctor gap 36 and is then transported along the outer peripheral surface of the hollow member 31 in the direction (the direction of an arrow F) opposite to the rotational direction of the magnet roll 32. The toner 34 is further transported along the undersurface of the toner guide 37 to reach the lower end portions 40*a* of the recording electrode patterns 40.

The toner 34 having reached the lower end portions of the recording electrode patterns 40 forms a toner chain (a chain formed by toner particles arranged along the magnetic line of force exerted by the magnet roll 32) 49 along the lower end portions 40*a*.

Under the state where such a toner chain 49 is formed, voltage pulses are selectively applied between the recording electrode patterns 40 and the rear electrode 45 by the voltage pulse applying circuit 48 through the conductor patterns 44, respectively. Consequently, in a manner similar to that in the case of the conventional recording apparatus, the particles at the end portions of the toner chain 49 on the selected recording electrode patterns 40 are transferred to the recording medium 47 by coulomb forces against the magnetic force exerted by the magnet roll 32. As a result, dots corresponding to the selected recording electrode patterns 40 are printed on the recording medium 47.

Thus, the voltage pulses are applied correspondingly to a picture signal, and if the transportation of the recording medium 47 is effected in parallel with the application of the voltage pulses, a picture corresponding to the picture signal is recorded on the recording medium 47.

On the other hand, the toner particles having reached the lower end portions 40*a* of the recording electrode patterns 40 but not having been transferred to the recording medium 47 are further transported along the rigid board 39 and the upper surface of the toner guide 37 to return to the hopper 33 section, since the rigid board 39, together with the hollow member 31, is housed within the magnetic field produced by the magnet roll 32 (i.e., there is no possibility that the rigid board 39 may interfere with the transportation of the toner 34).

In general, it is easier to carry out a fine-pattern processing on a rigid board than a flexible board, since the former is higher in mechanical strength and lower in moisture absorption than the latter. Therefore, if the recording electrode patterns 40 are formed on the rigid board 39 as in the case of this recording apparatus, then it is possible to make the recording electrode patterns 40 much higher in density than those in the conventional recording apparatus in which the recording electrode patterns are formed on a flexible board. Thus, it is possible to easily obtain a density of eight or more pieces per millimeter, for example. Moreover, since a necessary number (e.g., 2048 or more) of recording electrode patterns 40 can be formed on a single rigid board 39, there will be no problem of the linearity of arrangement of the electrode patterns 40 or the accuracy of the arrangement pitch, so that it is possible to obtain a recording head of high quality and reliability at low cost.

Moreover, in this recording apparatus, the recording electrode patterns 40 formed on the rigid board 39 are connected to the voltage pulse applying circuit 48 through the flexible circuit boards 42 as described above. Therefore, owing to the flexibility of the flexible circuit boards 42, it is advantageously possible to select at will the disposition of the voltage pulse applying circuit 48 with respect to the rigid board 39.

It is to be noted that although the longitudinal dimension of the rigid board 39 may be left out of consideration, the width (W in FIG. 7) thereof is about 20 to 40 mm, and the thickness thereof is about 1.6 to 2 mm. Therefore, if the rigid board 39 is disposed so that the plane thereof is parallel to the radial direction of the hollow member 31, the magnetic field produced by the magnet roll 32 will not reach the remoter end portion of the rigid board 39 unless the magnetization of the magnet roll 32 is increased, so that the transportation of the toner 34 will be hindered by the rigid board 39. If the magnetization of the magnet roll 32 is increased to avoid such a problem, the recording apparatus will be increased in size disadvantageously.

In this embodiment, however, the rigid board 39 is disposed so that the plane thereof is tangential to the outer peripheral surface of the hollow member 31 (i.e., tangential to the outer peripheral surface of a cylinder with its center at the axis of rotation of the magnet roll 32 and with a certain radius). Therefore, it is possible to house the rigid board 39 within the magnetic field produced by the magnet roll 32 so that the transportation of the toner 14 will not be hindered by the rigid board 19, without the need for increasing the magnetization of the magnet roll 32 or increasing the recording apparatus in size.

Moreover, in this embodiment, since the flexible circuit boards 42 are formed so as to rise from the rigid board 39 in the direction perpendicular to the axis of the magnetic roll 32, the direction of flow of the toner 34 transported along the rigid board 39 is parallel to the planes of the flexible circuit boards 42; hence, there is no possibility that the transportation of the toner 34 along the rigid board 39 may be hindered by the flexible circuit boards 42.

Figure 8:
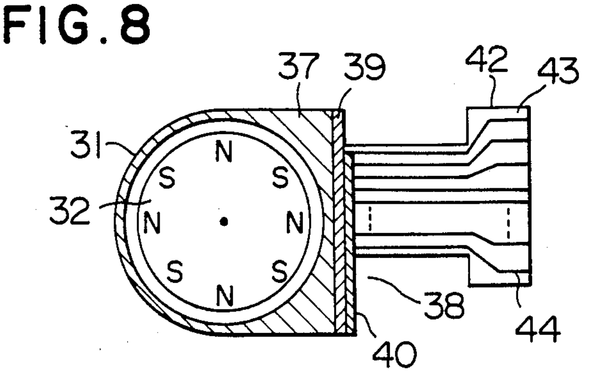
FIGS. 8, 9 and 10 show the constructions of recording heads in accordance with still further embodiments of the invention different from each other, respectively.

FIG. 8 is a sectional view of a still further embodiment of the invention (it is to be noted that in the following embodiments the parts identical or corresponding to those in the aforementioned embodiments are denoted by the same reference numerals as those in the aforementioned embodiments). The hollow member 31 in this embodiment is constituted by the hollow member 31 and the toner guide 37 in the above-mentioned embodiment which are integrally molded. Thus, the construction of the recording apparatus can be more simplified.

Figure 9:
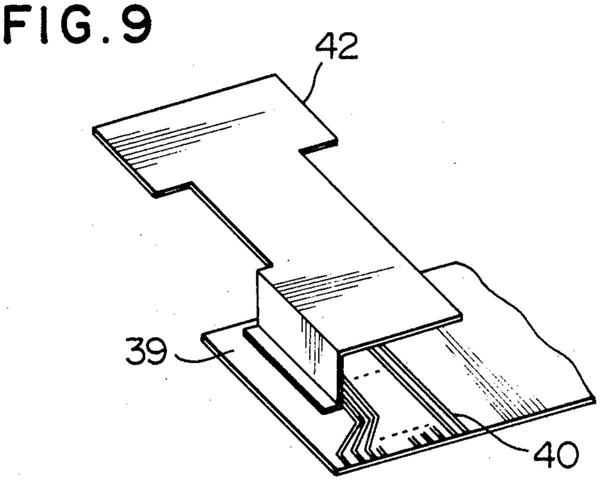

FIG. 9 is a perspective view of a recording head in accordance with a still further embodiment of the invention. In this embodiment, the flexible circuit board 42 is bent such that only the rising portion thereof from the rigid board 39 is perpendicular to the axis of the magnet roll 32, not shown, and the other portion thereof is parallel to the rigid board 39. Thus, the flexible circuit board 42 is only required to be perpendicular to the axis of the magnet roll 32 only at its rising portion from the rigid board 39, and the other portion of the flexible circuit board 42 may be directed in any direction, since it has no effect on the transportation of the toner. Moreover, although the flexible circuit boards 42 are all bent at a right angle in the above-mentioned embodiments, they may be formed to have a curved surface.

Figure 10:
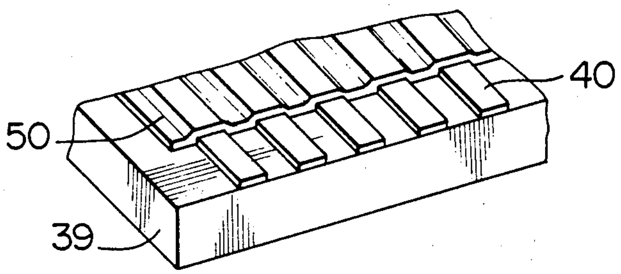

FIG. 10 is a perspective view of a recording head in accordance with a still further embodiment of the invention. In this embodiment, the portions of the recording electrode patterns 40 which are unnecessary for the recording operation are covered with an insulating material 50 by means of coating or molding. By so doing, the recording head can be improved in insulating properties.

Although the invention has been described through specific terms, it is to be noted here that the described embodiments are not exclusive and various changes and modifications may be imparted thereto without departing from the scope of the invention which is limited solely by the appended claims.

What is claimed is:

1. A recording apparatus having:
- a rear electrode;
- a hollow member of a non-magnetic material, said hollow member and said rear electrode being spaced from one another by a predetermined gap;
- a magnet rotatably housed in said hollow member;
- a driving device for rotating said magnet;
- means for supplying a magnetic toner onto the outer peripheral surface of said hollow member;
- a recording head attached on the outer peripheral side of said hollow member and housed, together with said hollow member, within a magnetic field produced by said magnet; and
- means for feeding a recording medium through the gap between said recording head and said rear electrode;
- wherein said recording head comprises:
- a rigid board of an insulating non-magnetic material attached on the outer peripheral side of said hollow member;
- recording electrode patterns formed on said rigid board and arranged to face said rear electrode; and
- a voltage pulse applying circuit mounted on said rigid board and adapted to selectively apply voltage pulses to said recording electrode patterns.

2. A recording apparatus according to claim 1, wherein said rigid board is constituted by a ceramic board.

3. A recording apparatus according to claim 1, wherein said rigid board is constituted by two or more boards secured to said hollow member.

4. A recording apparatus according to claim 1, wherein two boards constituting said rigid board are attached to said hollow member so as to form a substantially dogleg shape in combination.

5. A recording apparatus comprising:
- a hollow member made of a non-magnetic material;

a magnet rotatably housed in said hollow member;

a driving device for rotating said magnet;

means for supplying a magnetic toner onto the outer peripheral surface of said hollow member;

a multiplicity of recording electrodes disposed in the vicinity of the outer peripheral surface of said hollow member;

a rear electrode arranged to face said recording electrodes and separated from said recording electrodes by a gap;

means for feeding a recording medium through the gap between said recording electrodes and said rear electrode; and a voltage pulse applying circuit for selectively applying voltage pulses between said recording electrodes and said rear electrode, wherein said recording electrodes are constituted by recording electrode patterns, and said apparatus further includes: (a) a non-magnetic and insulating rigid board attached to the outer peripheral surface of said hollow member and mounting said recording electrode patterns; and (b) a flexible circuit board constituted by an insulating flexible board and conductor patterns formed thereon, and arranged for connecting said recording electrodes patterns to said voltage pulse applying circuit, said rigid board being housed, together with said hollow member, within a magnetic field produced by said magnet.

6. A recording apparatus according to claim 5, wherein said flexible circuit board is arranged to rise from said rigid board in the direction perpendicular to the axis of rotation of said magnet and is disposed in parallel to the moving direction of said toner.

7. A recording apparatus according to claim 5, wherein said rigid board is disposed so that the plane thereof is tangential to the outer peripheral surface of a cylinder with its center at the axis of rotation of said magnet and with a certain radius.

8. A recording apparatus according a claim 1, wherein said voltage pulse applying circuit mounted on said rigid board is covered with a non-magnetic protection cover.

* * * * *